Sept. 10, 1940.  J. H. VAN UUM  2,214,150
SPRING CLIP DEVICE
Filed May 28, 1937
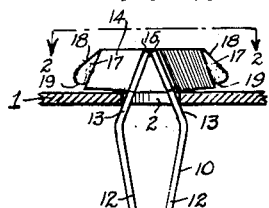
FIG. 1
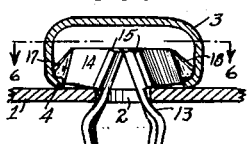
FIG. 5
FIG. 3
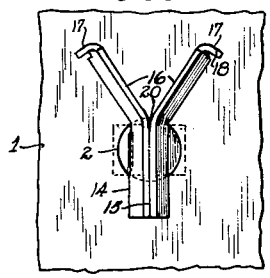
FIG. 2
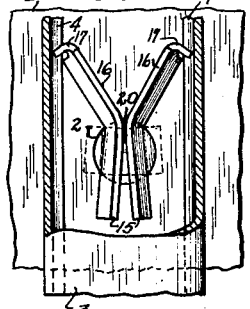
FIG. 6
FIG. 4
FIG. 7
FIG. 8
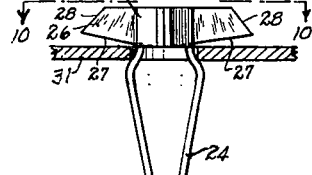
FIG. 9
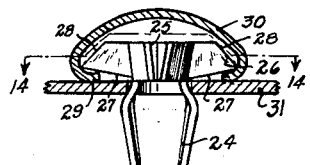
FIG. 13
FIG. 11
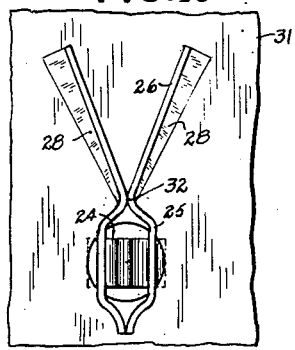
FIG. 10
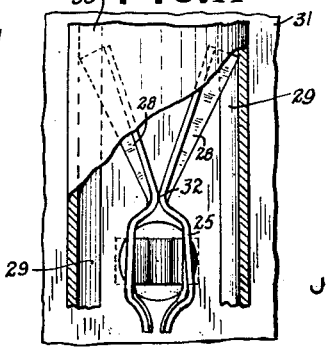
FIG. 14
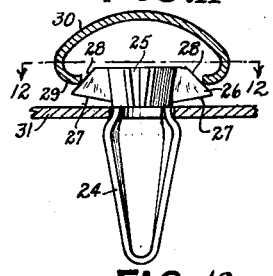
FIG. 12
INVENTOR.
JOHN H. VAN UUM.
by John H Renard
his ATTORNEY.

Patented Sept. 10, 1940

2,214,150

UNITED STATES PATENT OFFICE 2,214,150

SPRING CLIP DEVICE

John H. Van Uum, Lakewood, Ohio

Application May 28, 1937, Serial No. 145,331

4 Claims. (Cl. 85—5)

This invention relates to snap fastening devices and particularly to a snap fastening device for securing hollow members, such as automobile body bead trim and the like to apertured supports.

Heretofore snap fastening clips have been used in connection with bead trim and other members to be fastened to apertured supports, the clip securing the members to the apertured support by being snapped through the aperture and, thereafter, the element to be supported being snapped onto the head portion of the clip. Bead trims commonly employed in automobile body manufacture and the like are now being formed of thinner gauge and softer material with the result that when the bead trim is forced onto the head of the clip in order to snap the clip thereinto, the inturned flanges of the bead trim tend to bend and sometimes fold inwardly so that it is impossible to properly cooperate with the clip therewith.

It is necessary therefore to provide a clip which will permit snapping of the bead trim thereonto by applying relatively light pressure and yet which will securely engage both the trim and the support for tightly securing the trim or other member to the support.

The principal object of the present invention is to provide a snap fastening clip which may be inserted readily into an aperture of a support and to which the bead trim or other element may be applied to the clip by relatively light pressure.

Another object is to provide a clip having the above characteristics and which, when in securing engagement to the member and support, tightly secures the element to the support.

Still another object is to provide a clip which engages the support firmly and tightly under comparatively heavy spring pressure but in which the action of the bead trim engaging portion is so segregated from the direct flexure of the legs of the clip and the support engaging portion that the trim may be installed thereon without danger of bending any part of the trim itself.

Another specific object is to augment the gripping effect of the trim engaging portions and of the legs of the clip by developing useful torsional flexure of the legs by the movement of the trim engaging portion of the clip.

Other objects and advantages will become apparent from the following specification wherein reference is made to the drawing, in which:

Fig. 1 is a side elevation of a clip embodying the principles of the present invention installed in an apertured support preparatory to securing an element thereto, the support being shown in section for clearness in illustration;

Fig. 2 is a plan view of the clip and fragment of the support illustrated in Fig. 1 and is viewed by the line 2—2 in Fig. 1;

Fig. 3 is an elevation of the clip installed in the support and illustrates the first step in applying the bead trim or element to be supported thereto, the support and bead trim being shown in section for clearness in illustration;

Fig. 4 is a sectional view taken on a plane indicated by the line 4—4 in Fig. 3;

Fig. 5 is an elevation of the clip and sectional view of the bead trim and support, showing the installed relation thereof;

Fig. 6 is a sectional view taken on a plane indicated by the line 6—6 in Fig. 5;

Fig. 7 is a side elevation of the clip illustrated in Fig. 1 with the support and a portion of the clip shown in section as viewed from the right hand side of Fig. 1;

Figs. 8 and 9 are side and front elevations, respectively, of a modified form of the clip, the support being shown in section;

Fig. 10 is a view taken on a plane indicated by the line 10—10 in Fig. 9;

Fig. 11 is a view of the clip illustrated in Fig. 9, showing one step in the installation of the bead trim thereon, the bead trim and support being shown in section;

Fig. 12 is a sectional view taken on a plane indicated by the line 12—12 in Fig. 11;

Fig. 13 is a view similar to Fig. 11 but showing the bead trim in installed position; and Fig. 14 is a sectional view taken on a plane indicated by the line 14—14 in Fig. 13.

Referring to Figs. 1 to 7, inclusive, the clip is shown in connection with a supporting member 1 having an aperture 2 through which the clip is to be inserted. The particular clip illustrated is for securing to the support 1 a hollow member 3 such as bead trim, which has laterally spaced inturned flanges 4, the free ends of which flanges define a slot through which the head of the clip is to be inserted.

The clip comprises a single piece of spring metal indicated generally at 10, having a portion between its ends in the form of a nose 11 with integral legs 12 divergent away from the nose portion. Beginning partway of the length of the legs 12 are portions which are convergent away from the nose portion 11 and which provide locking shoulders 13 for engaging the support 1 at the inner face or the face opposite from which the trim member to be supported is connected. The nose 11 and legs 12 and shoulders 13 define the shank portion of the clip which is receivable nose foremost through the aperture in the support 1.

At the upper or free end portion of each leg 12 is an integral head portion 14. Each of the head portions 14 is in the form of an arm which extends generally normal to the leg 12, the arms extending on opposite sides of a plane passing symmetrically between the legs 12. The portions 15 and portions 16, respectively, of the head portions converge upwardly or away from the nose of the clip, as illustrated. Each head portion 16 is provided at its free ends with an outwardly extending fin 17 in the form of a locking portion which has one edge 18 sloping outwardly and toward the support 1 and affording a cam surface. Each locking portion 17 has a shoulder 19 which terminates in spaced relation to the lower edge of the associated head portion and to the outer face of the support 1. The locking portions or fins 17 are thus positioned beyond the lateral limits of the legs 12, and along said plane which passes symmetrically between the legs 12. Normally the head portions 15 abut at their upper edges, as illustrated in Figs. 1 and 2, for purposes later to be described, while the biased head portions 16 are divergent endwise in the common plane of the arm members of the head from the portions 15. The fins 17 are shaped so that when the bead trim or other element is installed thereon, they are substantially complementary to the interior of the trim and the inturned flanges thereof as better illustrated in Fig. 5. The divergent head portions 16 are of such length and angular disposition for the particular trim to be associated therewith or connected thereby that the fins 17 are normally spaced a greater distance apart laterally of the trim 3 than the width of the trim so that the head portions 16 must be flexed relatively toward each other for entering the slot between the flanges 4 and must reflex after entry to engage the interior of the trim with resilient pressure.

In operation, the clip is first installed nose portion 11 foremost in the aperture to the support by direct flatwise flexure of the legs relatively together. Due to the head portions 15 being in abutting relation, the clip is in the form of a substantially closed loop so that the entire spring effect of the legs and of the abutting head portions is effective for spring action, thus providing a relatively high direct gripping pressure which is segregated from the clamping pressure exerted on the trim by the head portions 16. The under edges of the abutting head portions 15 engage the outer face of the support 1 while the shoulders 13 engage the inner face thereof, thus positioning the clip as illustrated in Figs. 1 and 2. After the clip is thus installed the bead trim is then placed thereon as illustrated in Fig. 3 and then pressed toward the support whereupon the flanges 4 of the trim engage the cam edges 18 and force the spaced head portions 16 relatively toward each other without in any way disturbing the closed loop spring effect provided by the abutment of the head portions 15. During this operation the head portions 16 tend to flex and also to swing about the juncture of the head portions 15 and 16 as a pivot, as indicated at 20, the head portions 15 moving relatively apart about the same pivotal axis during the installation. Thus a point of contact between the head portions is maintained at all times so that the full direct flatwise flexure of the shank of the clip is segregated from the flexure of the head portions and is effective for holding the clip on the support. This movement of the head portions 16 also results in torsional flexure of the legs 12 which augments the gripping effect of the head portions 16 with the trim member.

Continued downward movement of the bead trim disposes the flanges 4 thereof below the locking shoulders 19 of the clip whereupon the head portions 16 reflex relatively outwardly, assisted by the torsional flexure of the legs, and firmly engage the interior of the trim 3 with outward yielding pressure, as indicated in Fig. 5. The shoulders 19 are preferably so positioned relative to the outer face of the support that they snugly accommodate the flanges of the trim thereBeneath and cooperate with the shoulders 13 in holding and drawing the bead trim tightly against the support.

Referring next to Figs. 8 to 14, inclusive, a modification of the clip is shown wherein provision is made for engaging and securing bead trim of different thicknesses of metal and for compensating for any irregularities in the structure occasioned by manufacture of the bead trim. In the modified clip the shank portion 24 compares in form and function to the shank portion of the clip above described. The head portions 25 and 26 operate in the same manner as the head portions 15 and 16 above described. However, instead of providing fins such as 17 and shoulders 19 on the head portions 26, the head portions 26 are twisted so as to lie in planes convergent away from the outer face of the support at a comparatively abrupt angle of convergence.

Due to this upward convergence of the head portions 26 and their divergence in a plane parallel to the plane of the support, the under edges 27 of the head portions 26 slope upwardly away from the outer face of the support. The free ends of the portions 26 thus provide downwardly sloping cam surfaces 28. The slope of the head portions 26 is such that the spacing of their lower edges away from the outer face of the support permits the accommodation of flanges 29 of a bead trim 30 thereBeneath. The clip is installed in the support 31 prior to snapping the bead trim thereinto in the same manner as the clip above described. The bead trim is then pressed over the head portions of the clip, the inturned flanges 29 of the bead trim engaging the cam surfaces 28 of the head portions and forcing the head portions relatively together to permit passage thereof through the slot defined by the flanges 29. After the flanges 29 pass the lower edges of the head portions 26 the head portions spring relatively apart until the lower corners thereof engage the inner surface of the bead trim, as illustrated in Fig. 13, and thus firmly anchor the bead trim in position. During such installation the head portions pivot about their abutting portions, indicated at 32 in Fig. 10, so that the closed loop spring effect of the shank is not weakened. The pivotal point 32, in the modified clip, is spaced from the axis of the shank so that some of the spring effect of the shank is effective for moving the head portions 26 relatively apart. Thus, if the head portions are moved toward each other and held toward each other by the trim, this action, instead of relieving pressure on the shank, tends to spread the shank apart and provide an even greater gripping action.

Since the force applied to the ends of the head portions 26 by the bead trim is applied at a considerable distance from the pivotal point 32, very slight pressure is required to move the head portions relatively together. Due to the mechanical advantage resulting from the proximity of the axis of the shank to the pivotal point 32, the movement of the head portions 26 provides a considerable mechanical advantage for moving the leg portions of the shank relatively apart and into tight engagement with the apertured support.

Having thus described my invention,

I claim:

1. A spring clip comprising a single piece of spring metal having a shank in the form of a loop providing spaced legs adapted for spring engagement with opposite portions of a hole in a support, and head members at the ends of the legs comprising elongated arms extending approximately normal thereto along the support and on opposite sides of a plane which passes between the legs, said arms having portions adjacent the ends of the legs, which portions are aligned for abutment, and free end portions remote from the legs and in spaced relationship, said free end portions being adapted and arranged for snap-fastening engagement, respectively, with spaced flanges of a member to be secured to the support.

2. A spring clip according to claim 1, wherein the ends of the arms opposite the spaced flange-engaging end portions lie materially closer to said plane than the said spaced flange-engaging end portions, so that they will not engage the flanges of the member to be secured, whereby the snap-fastening movements of said arms can cause or maintain the abutment aforesaid and tend to twist the legs to which respectively connected.

3. A spring clip according to claim 1, wherein portions of the arms are arranged to be maintained, by engagement of the legs with such hole, normally in stressed abutment at regions along said plane and on opposite sides of the median common plane of the legs, whereby said free end portions of the arms are normally held in a predetermined spaced relationship.

4. A spring clip according to claim 1, wherein the spaced portions of the arms diverge from the portions which are aligned for abutment, and have free end edges which diverge toward the support for camming engagement with such flanges of the member to be secured.

JOHN H. VAN UUM.